United States Patent
Nakagawa

(10) Patent No.: US 7,920,451 B2
(45) Date of Patent: Apr. 5, 2011

(54) RECORDING APPARATUS, METHOD FOR CONTROLLING THE APPARATUS, AND STORAGE MEDIUM STORING CONTROL PROGRAM

(75) Inventor: Koichi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/756,717

(22) Filed: Apr. 8, 2010

(65) Prior Publication Data

US 2010/0195477 A1    Aug. 5, 2010

Related U.S. Application Data

(62) Division of application No. 11/557,770, filed on Nov. 8, 2006, now Pat. No. 7,724,618.

(30) Foreign Application Priority Data

Nov. 11, 2005   (JP) ................. 2005-327893

(51) Int. Cl.
*G11B 7/00* (2006.01)
(52) U.S. Cl. ............. 369/53.24; 369/97; 369/47.22
(58) Field of Classification Search ........... 369/97, 369/47.27, 53.24, 53.29, 53.1, 47.29, 47.21, 369/47.22

See application file for complete search history.

(56) References Cited

U.S. PATENT DOCUMENTS

| 6,031,803 A | * | 2/2000 | Kubota et al. .......... 369/53.26 |
| 7,295,762 B2 | | 11/2007 | Sawabe et al. |
| 2005/0120167 A1 | | 6/2005 | Oiwa et al. |

FOREIGN PATENT DOCUMENTS

| JP | 09-259527 A | 10/1997 |
| JP | 2004-146019 A | 5/2004 |
| JP | 2004-355714 A | 12/2004 |
| JP | 2005-108282 A | 4/2005 |

* cited by examiner

*Primary Examiner* — Nabil Z Hindi
(74) *Attorney, Agent, or Firm* — Canon U.S.A. Inc., I.P. Division

(57) ABSTRACT

A recording apparatus to record data on a recording medium including a plurality of recording layers is provided. The recording apparatus includes a recording circuit adapted to record data on a recording layer selected from among the plurality of recording layers included on the recording medium; a recordable capacity detecting circuit adapted to detect recordable capacity of each of the plurality of recording layers; an instructing circuit adapted to provide instructions to start recording of the data; and a selecting circuit adapted to select a recording layer on which the data is to be recorded in accordance with the instructions to start recording provided from the instructing circuit based on the recordable capacity of the plurality of recording layers detected by the recordable capacity detecting circuit.

32 Claims, 6 Drawing Sheets

RECORDABLE CAPACITY OF FIRST LAYER
RECORDABLE CAPACITY OF SECOND LAYER

RECORDABLE TIME OF FIRST LAYER
RECORDABLE TIME OF SECOND LAYER

RECORDING APPARATUS, METHOD FOR CONTROLLING THE APPARATUS, AND STORAGE MEDIUM STORING CONTROL PROGRAM

CROSS REFERENCE TO RELATED APPLICATIONS

This application is a Divisional of U.S. patent application Ser. No. 11/557,770 filed Nov. 8, 2006 which claims the benefit of Japanese Application No. 2005-327893 filed Nov. 11, 2005, which are hereby incorporated by reference herein in its entirety.

BACKGROUND OF THE INVENTION

1. Field of the Invention

The present invention relates to a recording apparatus, such as a camera-integrated DVD recorder (DVD video camera), capable of recording moving or still images on a recording medium, a method for controlling the apparatus, and a control program.

2. Description of the Related Art

Hitherto, an apparatus to record and play back image data on/from an optical recording medium, such as a DVD, has been known.

In recent years, an optical disc having a plurality of recording layers has been proposed in a field of optical recording discs. For example, as disclosed in Japanese Patent Laid-Open No. 10-134375, an apparatus to record and play back image data on/from an optical disc having a plurality of layers has been proposed.

When image data is to be recorded on an optical disc having a plurality of recording layers, the image data is first recorded on a first recording layer, and then on a second recording layer after the first recording layer becomes full. If the optical disc has three or more layers, the image data is recorded on a third layer and a fourth layer after each recording layer becomes full.

When such an optical disc having a plurality of recording layers is to be played, focus control of an optical pickup needs to be performed for each layer. If data recording density is different in the respective recording layers, a track pitch and reflectivity are also different. Thus, adjustment in tracking control and focus control needs to be performed for each layer.

These processes need to be performed at startup of the apparatus or load of a disc, which takes time to be ready for playback, so that a user is kept waiting for the time.

If those processes are to be performed at switching of layers during playback, playback of moving images is suspended until adjustment has been done.

Likewise, during recording, adjustment in tracking control and focus control or adjustment of optimal laser power needs to be performed every time recording layers are switched. Accordingly, recording of image data is suspended for the adjustment time.

By accumulating image data that is input during adjustment of an optical pickup in a memory and by writing the image data accumulated in the memory on a disc after the adjustment, the image data can be continuously recorded without suspension.

However, an expensive large-capacity memory is required in order to accumulate data that is input during adjustment of a pickup at switching of recording layers, which leads to a cost increase of the apparatus.

For the reason of preventing a cost increase, it is not practical to provide such a large-capacity memory in inexpensive apparatuses, such as consumer-oriented apparatuses. Also, there is a problem that suspension of recording at switching of recording layers is inevitable.

SUMMARY OF THE INVENTION

A feature of the present invention has been made in view of the above-described problem, and the present invention is directed to providing a recording apparatus capable of decreasing the possibility that the recording layers in a recording medium are changed during recording of data, a method for controlling the apparatus, and a storage medium storing a control program.

According to an aspect of the present invention, there is provided a recording apparatus to record data on a recording medium including a plurality of recording layers. The recording apparatus includes: a recording circuit adapted to record data on a recording layer selected from among the plurality of recording layers included on the recording medium; a recordable capacity detecting circuit adapted to detect recordable capacity of each of the plurality of recording layers; an instructing circuit adapted to provide instructions to start recording of the data; and a selecting circuit adapted to select a recording layer on which the data is to be recorded in accordance with the instructions to start recording provided from the instructing circuit based on the recordable capacity of the plurality of recording layers detected by the recordable capacity detecting circuit.

Further features of the present invention will become apparent from the following description of exemplary embodiments with reference to the attached drawings.

DESCRIPTION OF THE EMBODIMENTS

First Exemplary Embodiment

Figure 1:
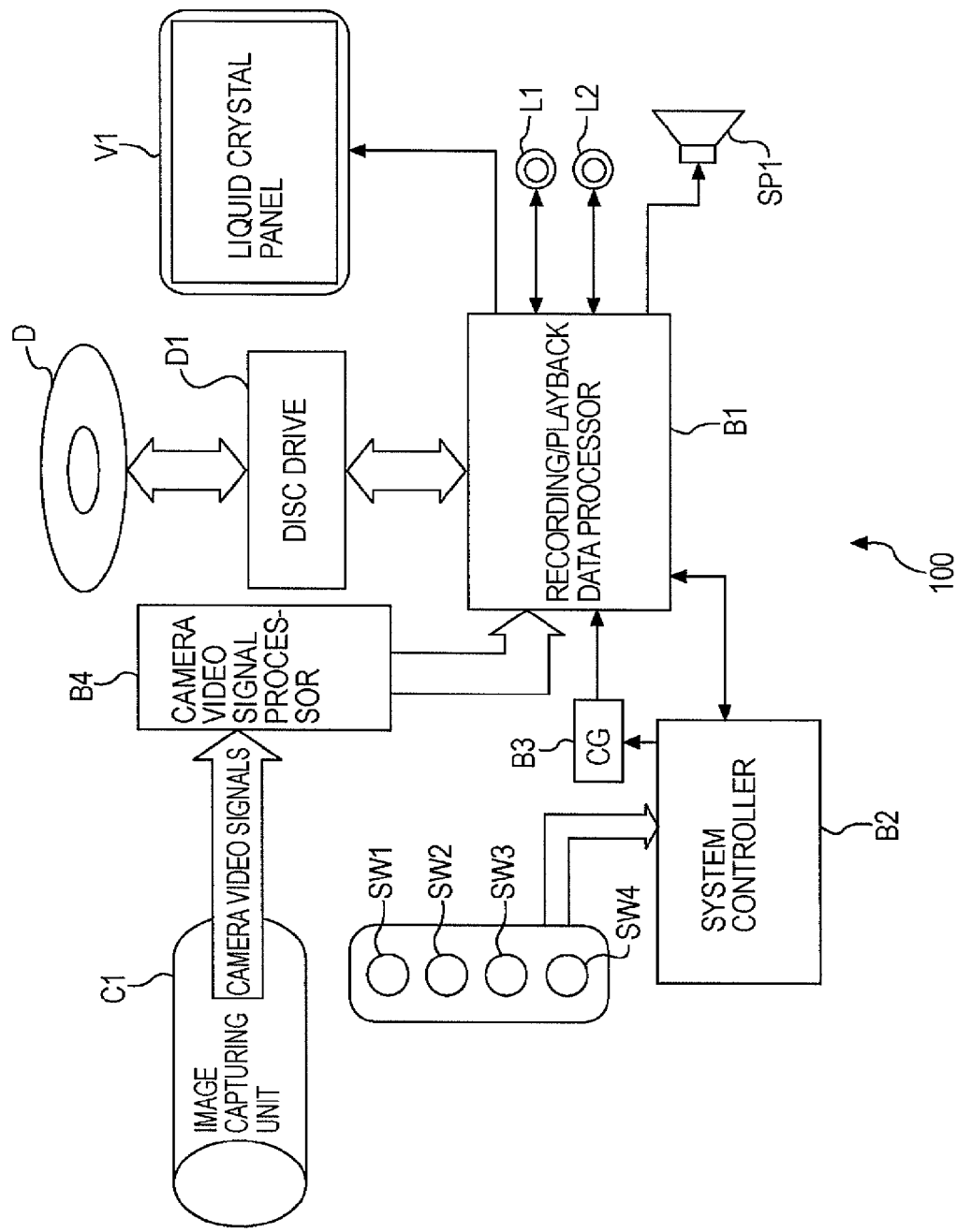
FIG. 1 shows an example of a configuration of a recording apparatus to which the present invention is applied.

FIG. 1 shows an example of a configuration of a recording apparatus 100 to which the present invention is applied.

An image capturing unit C1 includes an image capturing lens, a motor to drive the lens, and a CCD (charge-coupled device). The image capturing unit C1 converts captured image signals to digital data and outputs the data to a camera video signal processor B4 to process video signals.

The camera video signal processor B4 performs a predetermined process on video signals supplied from the image capturing unit C1 and outputs the signals to a recording/playback data processor B1.

The recording/playback data processor B1 converts the video signals processed in the camera video signal processor B4 to moving image data, records the data on an optical disc D, and processes data played back from the optical disc D.

A disc drive D1 analog-converts a stream to be recorded in the optical disc D under control by a system controller B2, the stream being supplied from the recording/playback data processor B1, and performs a process such as amplification. Then, the disc drive D1 outputs the stream to an optical head and controls emission of laser light in the optical head.

When reading data recorded on the optical disc D, the disc drive D1 amplifies a signal corresponding to reflected laser light supplied from the optical head and digital-converts the signal. Then, the disc drive D1 outputs the signal to the recording/playback data processor B1 as a disc playback stream. Also, the disc drive D1 generates a tracking error signal based on a signal corresponding to the intensity of reflected light supplied from the optical head, and outputs the generated signal to the recording/playback data processor B1.

Also, the disc drive D1 and the recording/playback data processor B1 perform the following operation at loading of the optical disc D, that is, performs calibration peculiar to a loaded disc, such as optimization of servo gain of each servo system of focus and spindle and optimization of laser power, in accordance with instructions from the system controller B2.

The system controller B2 includes a micro computer to comprehensively control various functions, a ROM (read only memory) to store a control program, a RAM (random access memory) for various operations, an I/O (input/output) port, and a timer counting unit. The system controller B2 controls operations of the recording/playback data processor B1 and the camera video signal processor B4 based on signals corresponding to instructions from a user supplied from various operation units. Furthermore, the system controller B2 controls the entire operation of the camera-integrated optical disc recording/playback apparatus including the disc drive D1 and a liquid crystal panel V1.

After the optical disc D has been loaded, the system controller B2 performs calibration, such as optimization of servo gain and laser power by controlling an optical system, as described above. Also, the system controller B2 reads management information recorded in a predetermined area of the optical disc D and stores the management information in a memory. The system controller B2 updates the content of the management information stored in the memory every time data is recorded or played back on/from the optical disc D, and reads the management information from the memory in accordance with instructions of the optical disc D and writes the read information on the optical disc D.

A character signal generator B3 generates character signals to be displayed on a screen.

Also, the recording apparatus 100 includes the liquid crystal panel V1 to display captured moving images and played back moving images, a speaker SP1 to output sound and voice, a video signal input/output terminal L1 to input/output video signals, and an audio signal input/output terminal L2 to input/output audio signals. Furthermore, the recording apparatus 100 includes a moving image recording control switch SW1 to control start and stop of recording moving images, a switch SW2 to select a recording layer on which data is to be actually written from among a plurality of recording layers in the optical disc D, a switch SW3 to display/hide a menu screen (described later), and a switch SW4 to select an item in the menu screen.

When a recording layer to actually write data is to be selected, the following methods may be used: a user selects a recording layer by pressing the switch SW2; or the system controller B2 preferentially and automatically selects a recording layer having the largest recordable capacity.

Hereinafter, operations performed during recording are described. The disc drive D1 reads management information (file system information) from the disc at turn on of the power or loading of the disc. Then, the system controller B2 searches for a free area where data can be recorded in the optical disc D based on the management information. At this time, the system controller B2 detects recordable capacity and calculates recordable time based on the recordable capacity and a recording mode. During recording, the system controller B2 monitors a decrease in the recordable capacity and periodically updates the recordable time. The system controller B2 constantly detects the status of the switches and monitors an operation performed by the user. When the user requests start of recording by operating the operation unit, the system controller B2 controls each unit so as to start recording of images and voices. The recording area on the optical disc D at this time is recordable capacity that has been searched for based on the management information. The series of these operations are repeated until stop of recording is requested.

Next, operations performed during playback are described. First, the system controller B2 issues a command to the disc drive D1 so that compressed video data is read from the optical disc D and is accumulated in the memory. At this time, the system controller B2 specifies a reading head sector in the optical disc D, a writing head address in the memory, and the amount of data. Then, the system controller B2 issues a command to the recording/playback data processor B1 so as to play back the compressed video data accumulated in the memory. The series of these operations are repeated until playback of images stops.

Figure 2:
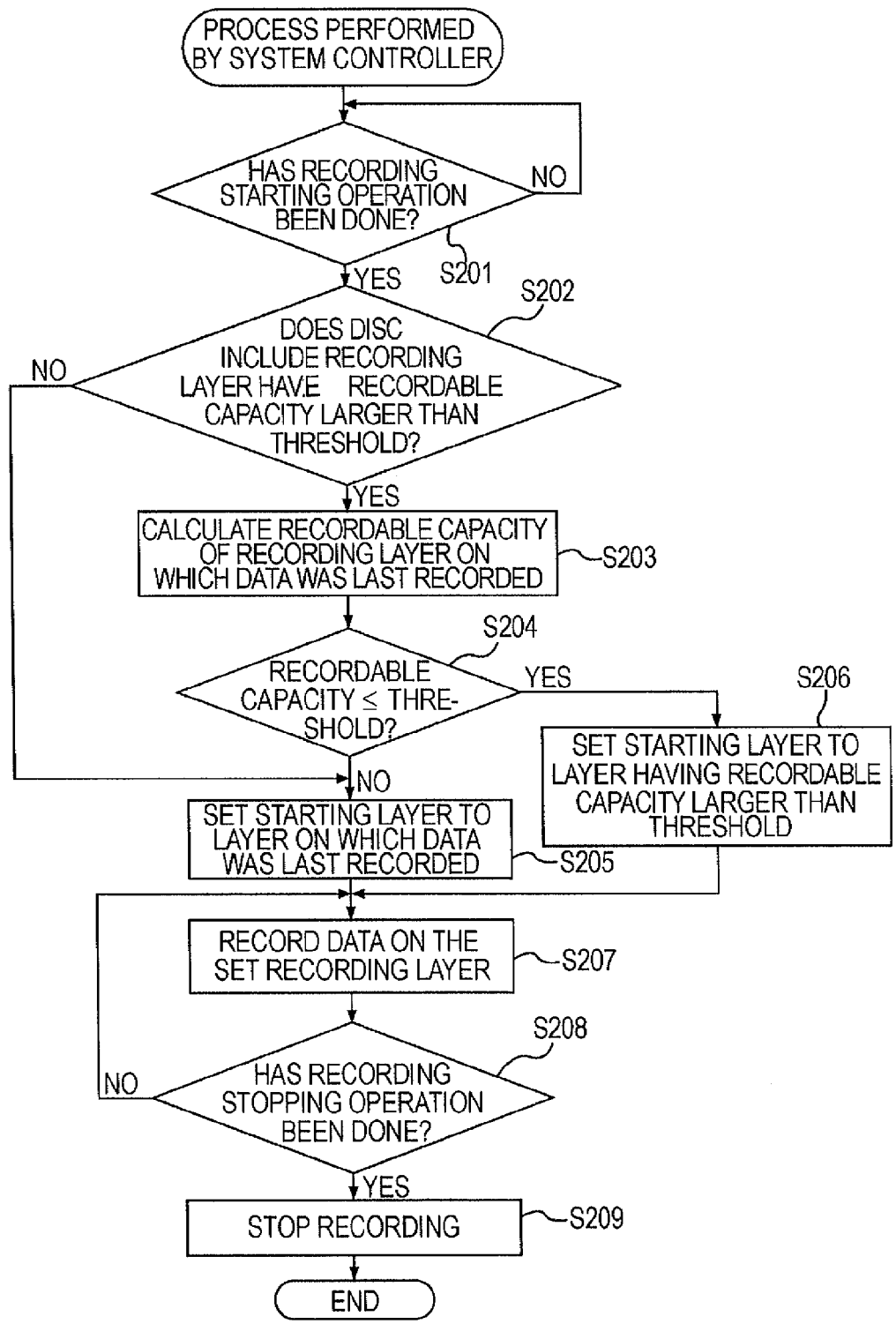
FIG. 2 is a flowchart showing a process according to a first embodiment performed by a system controller shown in FIG. 1.

FIG. 2 is a flowchart showing a process of selecting a recording layer performed during recording by the system controller B2 shown in FIG. 1.

First, in step S201, the system controller B2 determines whether a recording starting operation has been done. The recording starting operation is determined to be effective when the moving image recording control switch SW1 is pressed under a state where recording is stopped. If the recording starting operation has been done, the process proceeds to step S202. Otherwise, the system controller B2 determines again whether a recording starting operation has been done.

Figure 3:
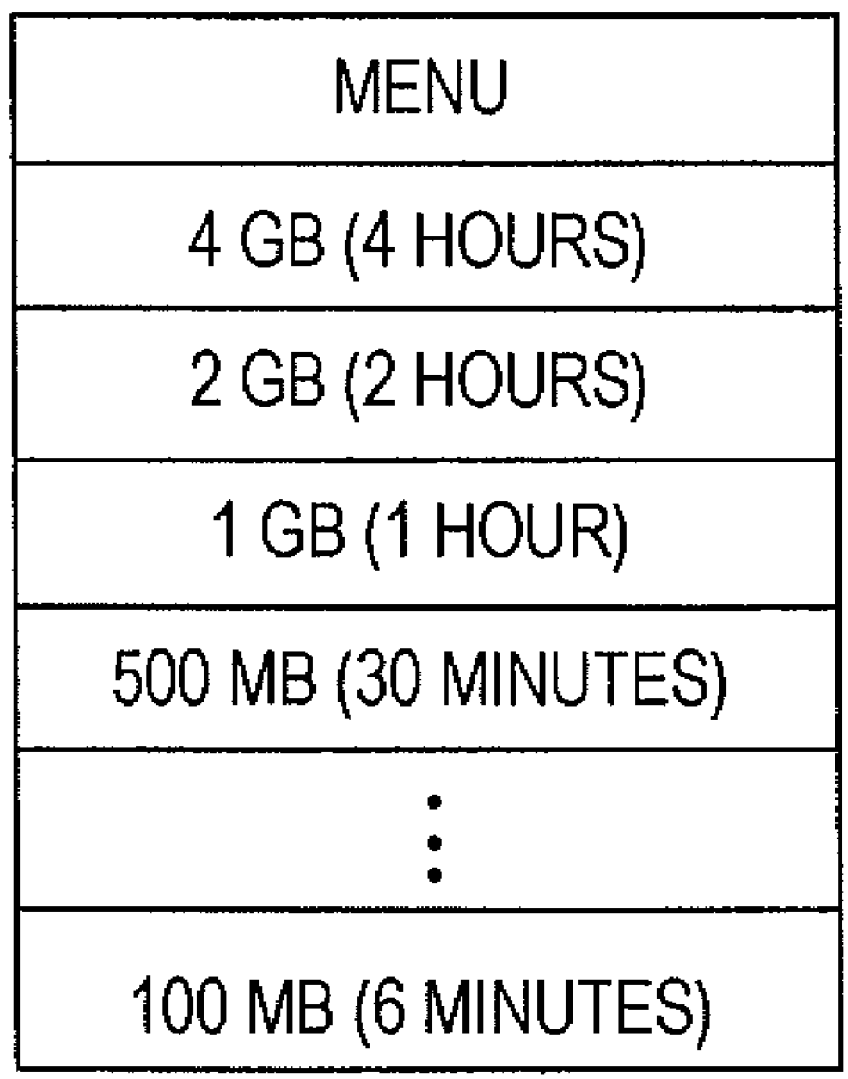
FIG. 3 shows an example of a menu screen to select a threshold.

In step S202, the system controller B2 determines whether the optical disc D used at this time for recording includes a recording layer having recordable capacity that is larger than a preset threshold. The threshold used here may be held as a fixed value by the DVD video camera 100 or may be set by a user with the switch SW3 shown in FIG. 1. In this case, a menu screen such as the one shown in FIG. 3 is displayed on the liquid crystal panel V1 upon press of the switch SW3 shown in FIG. 1 by the user. In the menu screen shown in FIG. 3, thresholds are displayed in a list. The user can change the thresholds in the order of 4 GB→2 GB→1 GB→500 MB→ . . . →100 MB→4 GB, by repeatedly pressing the switch SW4. The selected threshold is highlighted. If the user presses the switch SW3 shown in FIG. 1 while a desired threshold is highlighted, the menu screen disappears and the highlighted threshold is set. Alternatively, the system controller B2 may automatically adjust or change the threshold in accordance with a compression rate of moving image data, such as a bit rate of moving images.

If it is determined in step S202 that the optical disc D used at this time for recording includes no recording layer having recordable capacity larger than the preset threshold, the recording layer on which moving image data was recorded the last time is the recording layer on which moving image data is recorded at the last. Therefore, a switching point of recording layers does not exist in the process performed thereafter, and the recording layer on which moving image data is recorded at this time is the same as the recording layer on which moving image data was recorded the last time, so that the process proceeds to step S205.

If it is determined in step S202 that the optical disc D used at this time for recording includes a recording layer having recordable capacity larger than the preset threshold, a switching point of recording layers exists in the following process. Thus, the process proceeds to step S203 in order to determine whether the recording layer on which moving image data is recorded at this time should be changed.

In step S203, the system controller B2 calculates recordable capacity of the recording layer on which moving image data was last recorded, and then the process proceeds to step S204.

In step S204, the system controller B2 compares the recordable capacity calculated in step S203 with the preset threshold. If the recordable capacity is equal to or smaller than the threshold, the process proceeds to step S206. If the recordable capacity is larger than the threshold, the process proceeds to step S205.

In step S205, the system controller B2 sets the starting recording layer for recording moving image data at this time to the layer on which moving image data was last recorded, and the process proceeds to step S207.

In step S206, since it is determined in step S204 that the recordable capacity is equal to or smaller than the threshold, the system controller B2 performs a process to decrease the possibility that the moving image data to be recorded on a recording layer at this time includes a switching point of recording layers. That is, the system controller B2 sets the starting recording layer to record the moving image data at this time to a recording layer having recordable capacity larger than the threshold, and the process proceeds to step S207.

In step S207, the disc drive D1 records moving image data on the optical disc D. The recording layer on which the moving image data is recorded is the recording layer set in step S205 or step S206. The data recorded on the optical disc D includes video signals that have been captured by the image capturing unit C1 and that have been processed by the camera video signal processor B4. These video signals are converted to moving image data by the recording/playback data processor B1, and the moving image data is input to the disc drive D1 and is recorded on the optical disc D. Then, the process proceeds to step S208. The recording format of the moving image data is not limited, but various formats, such as MPEG2 and MPEG4, can be used. The data to be recorded on the disc may be moving image data based on video signals and audio signals input from the video signal input/output terminal L1 and the audio signal input/output terminal L2. In that case, the signals input from the terminals L1 and L2 are converted to moving image data by the recording/playback data processor B1, and the moving image data is input to the disc drive D1 and is recorded on the optical disc D.

In step S208, it is determined whether a recording stopping operation has been done. The recording stopping operation is determined to be effective when the moving image recording control switch SW1 is pressed under a state where recording is being performed. If it is determined that the recording stopping operation has been done, the process proceeds to step S209. Otherwise, the process returns to step S207, where recording is continued.

In step S209, a recording stopping command is transmitted to the disc drive D1, so that the recording operation ends.

As described above in detail, according to this embodiment, the following process is performed if recordable capacity and/or recordable time of the recording layer on which moving image data is recorded at this time becomes equal to or smaller than the threshold. That is, next recording of moving image data starts from a recording layer having sufficient recordable capacity and/or recordable time. Accordingly, it can be prevented that the moving image data recorded on the optical disc D includes a switching point of recording layers. As a result, the possibility that switching of recording layers in a recording medium (optical disc D) occurs during recording of data can be decreased.

In this embodiment, whether a recording layer is switched is determined by comparing recordable capacity of the disc with a threshold. However, recordable time may be compared with the threshold.

Second Exemplary Embodiment

Hereinafter, a second exemplary embodiment of the present invention is described.

The configuration of a recording apparatus according to this embodiment is the same as that of the DVD video camera 100 according to the first embodiment, and thus the corresponding description is not repeated.

Figure 4:
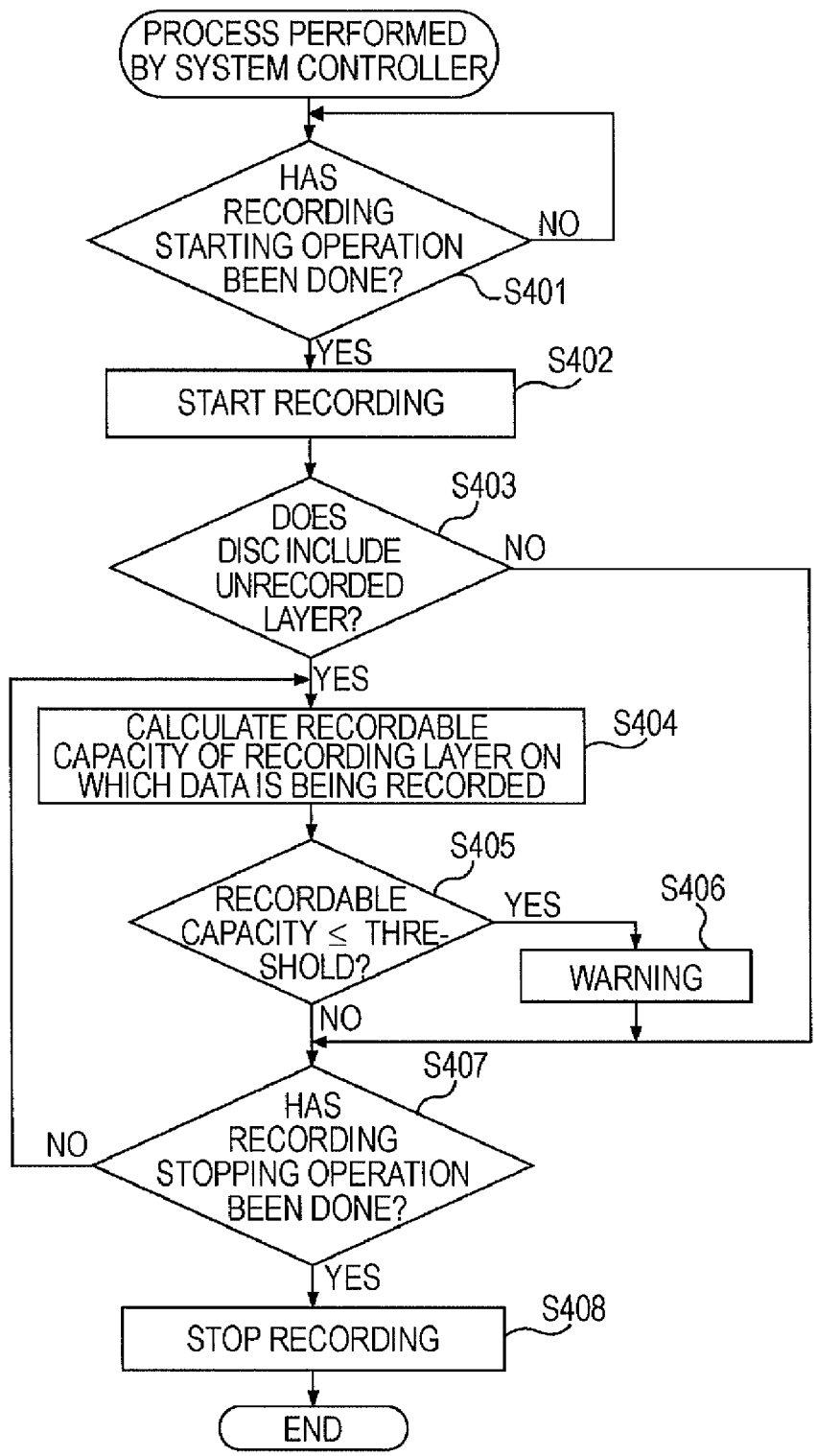
FIG. 4 is a flowchart showing a process according to a second embodiment performed by the system controller.

FIG. 4 is a flowchart showing a process performed by the system controller B2 shown in FIG. 1.

First, in step S401, the system controller B2 determines whether a recording starting operation has been done. The recording starting operation is determined to be effective when the moving image recording control switch SW1 is pressed under a state where recording is stopped. If the recording starting operation has been done, the process proceeds to step S402. Otherwise, the system controller B2 determines again whether a recording starting operation has been done.

In step S402, the disc drive D1 records moving image data on the optical disc D. The data recorded on the optical disc D includes video signals that have been captured by the image capturing unit C1 and that have been processed by the camera video signal processor B4. These video signals are converted to moving image data by the recording/playback data processor B1, and the moving image data is input to the disc drive D1 and is recorded on the optical disc D. The format of the moving image data is not limited in this embodiment, but various types of formats, such as RM, WMV, AVI, MPEG2, and MPEG4 can be used. The data to be recorded on the optical disc D may be moving image data based on video signals and audio signals input from the video signal input/output terminal L1 and the audio signal input/output terminal L2. In that case, the signals input from the terminals L1 and L2 are converted to moving image data by the recording/playback data processor B1, and the moving image data is input to the disc drive D1 and is recorded on the optical disc D.

Figure 5A:
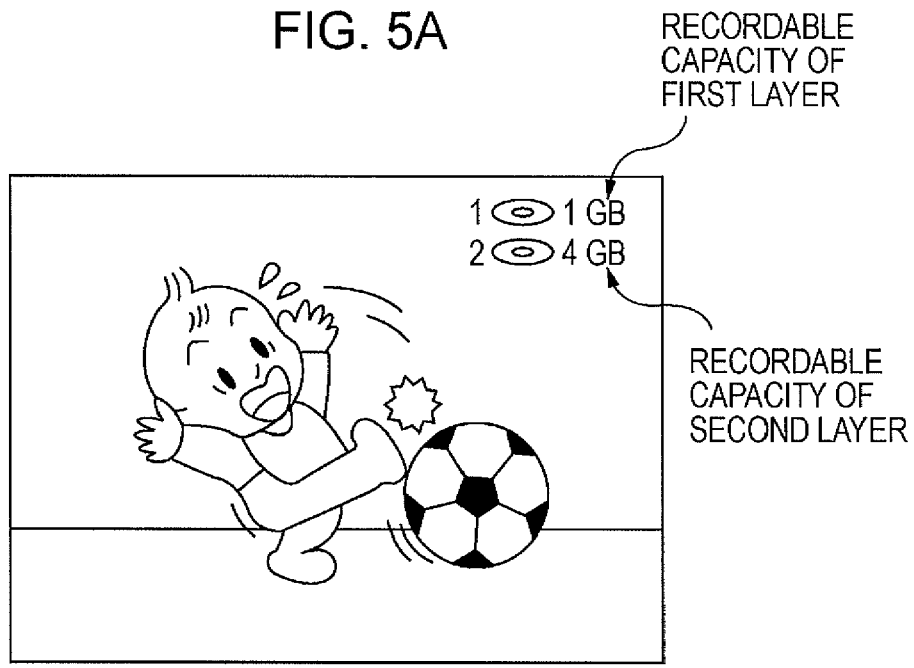
FIG. 5A shows an example of recordable capacity of each layer displayed on a liquid crystal panel.
Figure 5B:
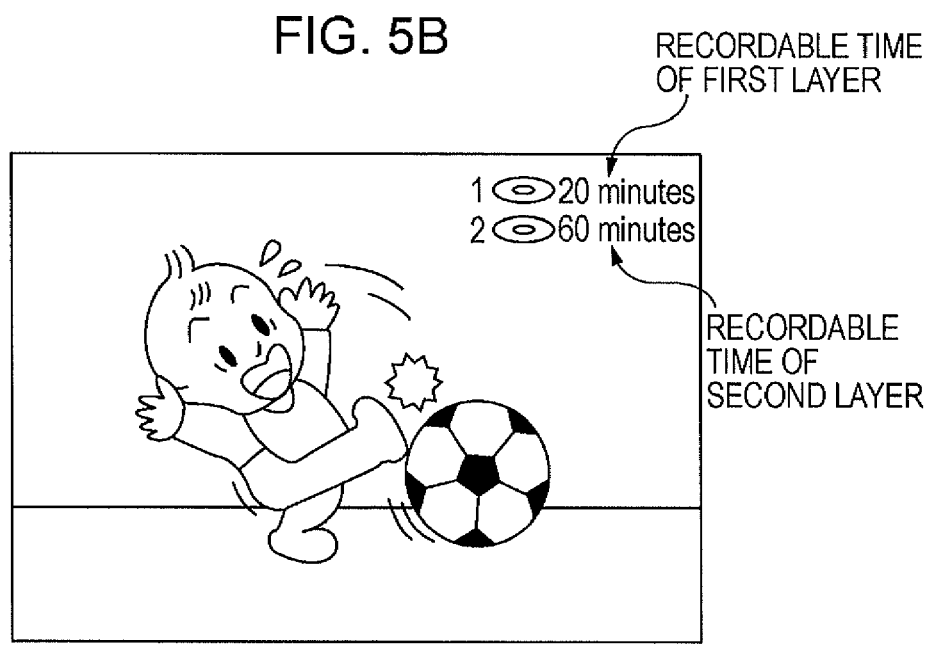
FIG. 5B shows an example of recordable time of each layer displayed on the liquid crystal panel.

In step S403, the system controller B2 determines whether the optical disc D on which data is being recorded has an unrecorded layer. If an unrecorded layer does not exist, the recording layer on which data is now being recorded is regarded as the last layer. Thus, a switching point of recording layers does not exist in the following process, and warning is not given to the user. In this case, the process proceeds to step S407. If an unrecorded layer exists, a switching point of recording layers exists in the following process. In this case, the process proceeds to step S404 so as to determine whether warning should be given to the user. In exemplary embodiments, when determining whether an unrecorded layer exists in step S403, recordable capacity of each recording layer is calculated and the recordable capacity of each recording layer is displayed on the liquid crystal panel V1. FIGS. 5A and 5B show examples of the display. In these examples, recordable capacity of first and second layers in the optical disc D are displayed in two lines at the upper right of the liquid crystal panel V1. In FIG. 5A, actual recordable capacity of each recording layer (e.g., 1 GB and 4 GB) is displayed. Alternatively, as shown in FIG. 5B, recordable time may be displayed. Also, both the recordable time and the recordable capacity may be displayed. The recordable capacity and the recordable time are displayed in a method adaptable to each of various recording formats, such as RM, WMV, AVI, MPEG2, and MPEG4. For example, when moving image data of a WMV format is to be recorded on the optical disc D, actual recordable capacity of each recording layer is displayed. When moving image data of an MPEG2 or MPEG4 format is to be recorded on the optical disc D, recordable time is displayed. When moving image data of an AVI format is to be recorded on the optical disc D, both recordable time and recordable capacity may be displayed. Alternatively, display of recordable time may be changed in accordance with a compression rate.

In this embodiment, recordable capacity of each recording layer is detected in step S403, but the recordable capacity may be detected at insertion of the disc. Also, the screen shown in FIG. 5A or 5B may be displayed at stop of recording, and a layer on which data is recorded next may be indicated.

In step S404, the system controller B2 calculates recordable capacity of the recording layer on which moving image data is recorded in step S402, and then the process proceeds to step S405. Also, in step S404, the liquid crystal panel V1 updates display of the recordable capacity of the recording layer on which moving image data is recorded in step S402.

In step S405, the system controller B2 compares the recordable capacity calculated in step S404 with a preset threshold. If the recordable capacity is equal to or smaller than the threshold, the process proceeds to step S406. If the recordable capacity is larger than the threshold, the process proceeds to step S407. The threshold used here may be held as a fixed value by the DVD video camera 100 or may be set by a user with the switch SW3 shown in FIG. 1. In this case, the menu screen shown in FIG. 3 is displayed on the liquid crystal panel V1 upon press on the switch SW3 shown in FIG. 1 by the user. In the menu screen shown in FIG. 3, thresholds are displayed in a list. The user can change the thresholds in the order of 4 GB→2 GB →1 GB→500 MB→ . . . →100 MB→4 GB, by repeatedly pressing the switch SW4. The selected threshold is highlighted. If the user presses the switch SW3 shown in FIG. 1 while a desired threshold is highlighted, the menu screen disappears and the highlighted threshold is set. Alternatively, the system controller B2 may automatically adjust or change the threshold in accordance with a compression rate of moving image data, such as a bit rate of moving images.

Figure 6:
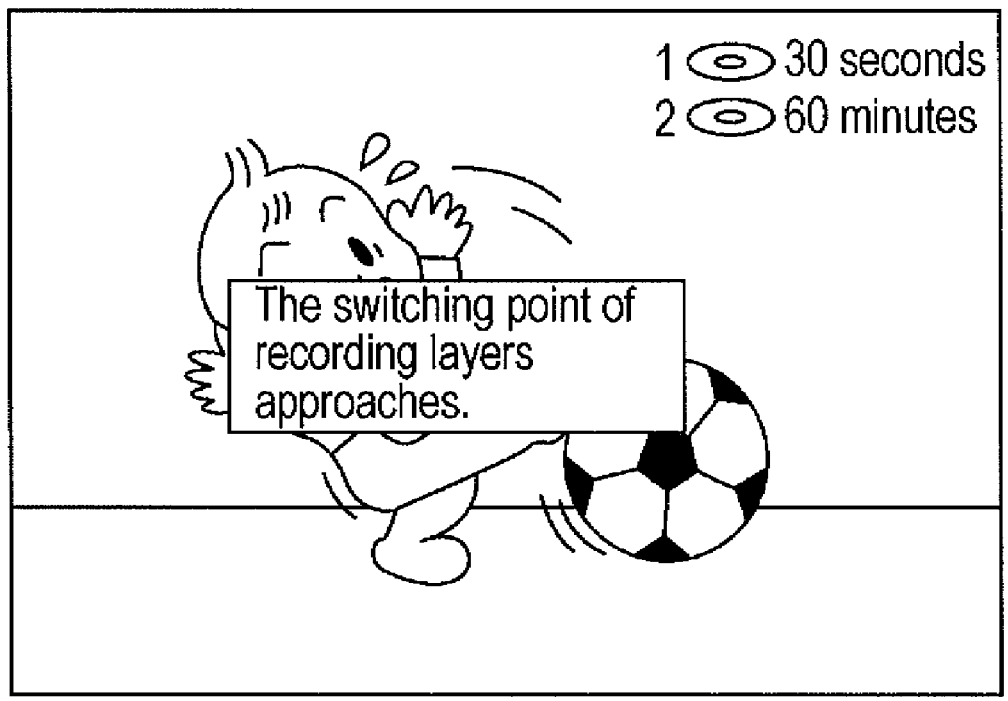
FIG. 6 shows an example of a warning screen displayed on the liquid crystal panel.

In step S406, since the recordable capacity is determined to be equal to or larger than the threshold in step S405, the system controller B2 warns the user that the switching point of recording layers approaches. In this case, a warning sound is output from the speaker SP1 and the character signal generator B3 is allowed to generate a character string "the switching point of recording layers approaches", the recording/playback data processor B2 superimposes the character string on a recorded moving image, and the liquid crystal panel V1 displays the image (see FIG. 6). The warning method is not limited to this, but includes at least one of output of a warning sound from the speaker SP1 and display of the character string. Alternatively, displayed recordable time or recordable capacity may be blinked. After the warning operation, the process proceeds to step S407. The warning operation may be performed at stop of recording by comparing the recordable time or recordable capacity with the threshold.

In step S407, it is determined whether a recording stopping operation has been done. The recording stopping operation is determined to be effective when the moving image recording control switch SW1 is pressed under a state where recording is performed. If the recording stopping operation has been done, the process proceeds to step S408. Otherwise, the process returns to step S404.

In step S408, the system controller B2 instructs the disc drive D1 to stop recording, so that the recording operation ends.

In this embodiment, whether an unrecorded layer exists is determined in step S403, but this step may be omitted. In that case, a warning operation to notify the user that a data recording area in the recording layer is small is performed in step S406. When a rewritable disc is used, whether data that has already been recorded on another layer can be overwritten may be determined, or a determination result that the data can be overwritten may be notified to the user.

As described above in detail, according to this embodiment, during recording of moving image data on a plurality of recording layers, recordable capacity and/or recordable time of each recording layer is displayed. Alternatively, a warning message is displayed on the liquid crystal panel V1 when the recordable capacity and/or recordable time of the recording layer on which data is being recorded becomes equal to or smaller than a preset threshold. Accordingly, a user can shoot while being aware of a switching point of recording layers, and thus it can be prevented that switching of recording layers occurs in an important shooting scene. As a result, the possibility that switching of recording layers of a recording medium (optical disc D) occurs during recording of data can be decreased.

In the above-described embodiments, moving image data is recorded on the optical disc D. However, the type of data is not limited to moving image data. For example, still image data, audio data, music data, and document data can also be used.

A feature of the present invention can be achieved also by supplying a storage medium storing program code (software) to realize functions of the above-described embodiments to a system or an apparatus. This is because the feature of the present invention is achieved by allowing a computer (or CPU or micro-processing unit (MPU)) of the system or apparatus to read and execute the program code stored in the storage medium.

In that case, the program code read from the storage medium realizes the functions of the above-described embodiments, so that the program code and the storage medium storing the program code are included in the present invention.

Examples of the storage medium to supply the program code include a floppy disk, a hard disk, a magneto-optical (MO) disc, a compact disk-ROM (CD-ROM), a CD-recordable (CD-R), and a CD-rewritable (CD-RW). Also, the examples include optical discs such as a digital versatile disk-ROM (DVD-ROM), a DVD-RAM, a digital audio disk-rewritable (DAD RW), and a DAD+RW, a magnetic tape, a nonvolatile memory card, and a ROM. Alternatively, the program code may be downloaded through a network.

The functions of the above-described embodiments are realized by allowing the computer to read and execute the program code. In addition, the functions of the above-described embodiments may be realized by allowing an OS (operating system) operating on the computer to perform part or all of an actual process on the basis of instructions of the program code.

The following method may also be used to realize the functions of the above-described embodiments. First, the program code read from the storage medium is written in a memory provided in a function expanding board inserted into the computer or a function expanding unit connected to the computer. Then, a CPU or the like provided in the expanding board or the expanding unit performs part or all of an actual process on the basis of instructions of the program code.

Although the embodiments of the present invention have been described, it will be understood by those skilled in the art that the present invention should not be limited to the described embodiments, but various changes and modifications can be made within the spirit and the scope of the present invention. Accordingly, the scope of the present invention is not limited to the described embodiments but by the following claims and their equivalents.

What is claimed is:

1. A recording apparatus, comprising:
   a recording circuit adapted to record data on a recording position selected from among two or more recording positions;
   a recordable capacity detecting circuit adapted to detect recordable capacity of each of the two or more recording positions;
   an instructing circuit adapted to provide instructions to start recording of the data;
   a selecting circuit adapted to select a recording position on which the data is to be recorded in accordance with the instructions to start recording provided by the instructing circuit based on the recordable capacity of the two or more recording positions detected by the recordable capacity detecting circuit;
   a setting circuit adapted to set a threshold; and
   an adjusting circuit adapted to automatically adjust the threshold in accordance with a compression rate of data to be recorded on the recording position,
   wherein the selecting circuit is adapted to select one of other recording positions if the recordable capacity of the recording position that is selected immediately before the instructions to start recording is equal to or smaller than the threshold.

2. The recording apparatus according to claim 1, further comprising:
   a display circuit adapted to display the recordable capacity by capacity and/or time.

3. The recording apparatus according to claim 1, wherein the selecting circuit is adapted to select a recording position on which the data is to be recorded from among the recording positions having recordable capacity larger than the predetermined threshold if the recordable capacity of the recording position that is selected immediately before the instructions to start recording is equal to or smaller than the threshold.

4. The recording apparatus according to claim 1, wherein the setting circuit is further adapted to display a plurality of thresholds that can be set as the threshold.

5. A method for recording by a recording apparatus, the method comprising:
   recording data on a recording position selected from among two or more recording positions;
   detecting recordable capacity of each of the two or more recording positions;
   providing instructions to start recording of the data;
   selecting a recording position on which the data is to be recorded in accordance with the instructions to start recording based on the recordable capacity of the two or more recording positions detected;
   setting a threshold; and
   automatically adjusting the threshold in accordance with a compression rate of data to be recorded on the recording position,
   wherein one of other recording positions is selected if the recordable capacity of the recording position that is selected immediately before the instructions to start recording is equal to or smaller than the threshold.

6. The method according to claim 5, further comprising:
   displaying the recordable capacity by capacity and/or time.

7. The method according to claim 5, wherein a recording position is selected on which the data is to be recorded from among the recording positions having recordable capacity larger than the predetermined threshold if the recordable capacity of the recording position that is selected immediately before the instructions to start recording is equal to or smaller than the threshold.

8. The method according to claim 5, further comprising:
   displaying a plurality of thresholds that can be set as the threshold.

9. A recording apparatus, comprising:
   a recording circuit adapted to record data on a recording position selected from among two or more recording positions;
   a recordable capacity detecting circuit adapted to detect recordable capacity of each of the two or more recording positions;
   an instructing circuit adapted to provide instructions to start recording of the data;
   a selecting circuit adapted to select a recording position on which the data is to be recorded in accordance with the instructions to start recording provided by the instructing circuit based on the recordable capacity of the two or more recording positions detected by the recordable capacity detecting circuit; and
   a setting circuit adapted to automatically set a threshold in accordance with a compression rate of data to be recorded on the recording position,
   wherein the selecting circuit is adapted to select one of other recording positions if the recordable capacity of the recording position that is selected immediately before the instructions to start recording is equal to or smaller than the threshold.

10. The recording apparatus according to claim 9, further comprising:
    a display circuit adapted to display the recordable capacity by capacity and/or time.

11. The recording apparatus according to claim 9, wherein the selecting circuit is adapted to select a recording position on which the data is to be recorded from among the recording positions having recordable capacity larger than the predetermined threshold if the recordable capacity of the recording position that is selected immediately before the instructions to start recording is equal to or smaller than the threshold.

12. The recording apparatus according to claim 9, wherein the setting circuit is further adapted to display a plurality of thresholds that can be set as the threshold.

13. A method for recording by a recording apparatus, the method comprising:
  recording data on a recording position selected from among two or more recording positions;
  detecting recordable capacity of each of the two or more recording positions;
  providing instructions to start recording of the data;
  selecting a recording position on which the data is to be recorded in accordance with the instructions to start recording based on the recordable capacity of the two or more recording positions detected; and
  automatically setting a threshold in accordance with a compression rate of data to be recorded on the recording position,
  wherein one of other recording positions is selected if the recordable capacity of the recording position that is selected immediately before the instructions to start recording is equal to or smaller than the threshold.

14. The method according to claim 13, further comprising:
  displaying the recordable capacity by capacity and/or time.

15. The method according to claim 13, wherein a recording position is selected on which the data is to be recorded from among the recording positions having recordable capacity larger than the predetermined threshold if the recordable capacity of the recording position that is selected immediately before the instructions to start recording is equal to or smaller than the threshold.

16. The method according to claim 13, further comprising displaying a plurality of thresholds that can be set as the threshold.

17. A recording apparatus, comprising:
  a recording circuit adapted to record data on a recording position selected from among two or more recording positions;
  a recordable capacity detecting circuit adapted to detect recordable capacity of each of the two or more recording positions;
  an instructing circuit adapted to provide instructions to start recording of the data;
  a selecting circuit adapted to select a recording position on which the data is to be recorded in accordance with the instructions to start recording provided by the instructing circuit based on the recordable capacity of the two or more recording positions detected by the recordable capacity detecting circuit;
  a setting circuit adapted to set a threshold; and
  an adjusting circuit adapted to automatically adjust the threshold in accordance with a bit rate of data to be recorded on the recording position,
  wherein the selecting circuit is adapted to select one of other recording positions if the recordable capacity of the recording position that is selected immediately before the instructions to start recording is equal to or smaller than the threshold.

18. The recording apparatus according to claim 17, further comprising:
  a display circuit adapted to display the recordable capacity by capacity and/or time.

19. The recording apparatus according to claim 17, wherein the selecting circuit is adapted to select a recording position on which the data is to be recorded from among the recording positions having recordable capacity larger than the predetermined threshold if the recordable capacity of the recording position that is selected immediately before the instructions to start recording is equal to or smaller than the threshold.

20. The recording apparatus according to claim 17, wherein the setting circuit is further adapted to display a plurality of thresholds that can be set as the threshold.

21. A method for recording by a recording apparatus, the method comprising:
  recording data on a recording position selected from among two or more recording positions;
  detecting recordable capacity of each of the two or more recording positions;
  providing instructions to start recording of the data;
  selecting a recording position on which the data is to be recorded in accordance with the instructions to start recording provided by the instructing circuit based on the recordable capacity of the two or more recording positions detected;
  setting a threshold; and
  automatically adjusting the threshold in accordance with a bit rate of data to be recorded on the recording position,
  wherein one of other recording positions is selected if the recordable capacity of the recording position that is selected immediately before the instructions to start recording is equal to or smaller than the threshold.

22. The method according to claim 21, further comprising:
  displaying the recordable capacity by capacity and/or time.

23. The method according to claim 21, wherein a recording position is selected on which the data is to be recorded from among the recording positions having recordable capacity larger than the predetermined threshold if the recordable capacity of the recording position that is selected immediately before the instructions to start recording is equal to or smaller than the threshold.

24. The method according to claim 21, further comprising:
  displaying a plurality of thresholds that can be set as the threshold.

25. A recording apparatus, comprising:
  a recording circuit adapted to record data on a recording position selected from among two or more recording positions;
  a recordable capacity detecting circuit adapted to detect recordable capacity of each of the two or more recording positions;
  an instructing circuit adapted to provide instructions to start recording of the data;
  a selecting circuit adapted to select a recording position on which the data is to be recorded in accordance with the instructions to start recording provided by the instructing circuit based on the recordable capacity of the two or more recording positions detected by the recordable capacity detecting circuit; and
  a setting circuit adapted to automatically set a threshold in accordance with a bit rate of data to be recorded on the recording position,
  wherein the selecting circuit is adapted to select one of other recording positions if the recordable capacity of the recording position that is selected immediately before the instructions to start recording is equal to or smaller than the threshold.

26. The recording apparatus according to claim 25, further comprising:
  a display circuit adapted to display the recordable capacity by capacity and/or time.

27. The recording apparatus according to claim 25, wherein the selecting circuit is adapted to select a recording position on which the data is to be recorded from among the recording positions having recordable capacity larger than the predetermined threshold if the recordable capacity of the recording position that is selected immediately before the instructions to start recording is equal to or smaller than the threshold.

28. The recording apparatus according to claim 25, wherein the setting circuit is further adapted to display a plurality of thresholds that can be set as the threshold.

29. A method for recording by a recording apparatus, the method comprising:
  recording data on a recording position selected from among two or more recording positions;
  detecting recordable capacity of each of the two or more recording positions;
  providing instructions to start recording of the data;
  selecting a recording position on which the data is to be recorded in accordance with the instructions to start recording based on the recordable capacity of the two or more recording positions detected; and
  automatically setting a threshold in accordance with a bit rate of data to be recorded on the recording position, wherein one of other recording positions is selected if the recordable capacity of the recording position that is selected immediately before the instructions to start recording is equal to or smaller than the threshold.

30. The method according to claim 29, further comprising: displaying the recordable capacity by capacity and/or time.

31. The method according to claim 29, wherein a recording position is selected on which the data is to be recorded from among the recording positions having recordable capacity larger than the predetermined threshold if the recordable capacity of the recording position that is selected immediately before the instructions to start recording is equal to or smaller than the threshold.

32. The method according to claim 29, further comprising displaying a plurality of thresholds that can be set as the threshold.

* * * * *